United States Patent
Holland et al.

(10) Patent No.: US 11,625,496 B2
(45) Date of Patent: Apr. 11, 2023

(54) METHODS FOR SECURING AND ACCESSING A DIGITAL DOCUMENT

(71) Applicant: THALES DIS CPL USA, INC., Belcamp, MD (US)

(72) Inventors: Christopher Holland, Cedar Park, TX (US); Russell Egan, Cedar Park, TX (US)

(*) Notice: Subject to any disclaimer, the term of this patent is extended or adjusted under 35 U.S.C. 154(b) by 321 days.

(21) Appl. No.: 16/156,349

(22) Filed: Oct. 10, 2018

(65) Prior Publication Data
US 2020/0117816 A1  Apr. 16, 2020

(51) Int. Cl.
*G06F 21/62* (2013.01)
*G06F 21/33* (2013.01)

(52) U.S. Cl.
CPC .......... *G06F 21/6218* (2013.01); *G06F 21/33* (2013.01); *G06F 21/6227* (2013.01)

(58) Field of Classification Search
CPC ...... G06F 21/00; G06F 21/602; G06F 21/604; G06F 21/62; G06F 21/6209; G06F 21/6245; G06F 21/6218; G06F 16/9566; G06F 21/33; G06F 21/10; H04L 9/0863; H04L 63/20; H04L 63/102; H04L 63/105
See application file for complete search history.

(56) References Cited

U.S. PATENT DOCUMENTS

| | | | |
|---|---|---|---|
| 8,037,157 B2 | 10/2011 | Xiao et al. | |
| 8,364,712 B2 | 1/2013 | O'Sullivan et al. | |
| 8,458,487 B1 * | 6/2013 | Palgon | G06F 21/00 380/277 |
| 8,997,248 B1 * | 3/2015 | McKay | G06F 21/62 726/27 |
| 10,025,941 B1 * | 7/2018 | Griffin | G06F 21/6209 |
| 10,474,836 B1 * | 11/2019 | Cieslak | H04L 63/101 |

(Continued)

FOREIGN PATENT DOCUMENTS

| | | |
|---|---|---|
| CN | 101859360 A | 10/2010 |
| CN | 102722737 A | 10/2012 |
| WO | 02/33518 A2 | 4/2002 |

OTHER PUBLICATIONS

Notification of Transmittal of the International Search Report and the Written Opinion of the International Searching Authority (Forms PCT/ISA/220, PCT/ISA/210, and PCT/ISA/237) dated Dec. 13, 2019, in related International Application No. PCT/US2019/055551. (12 pages).

(Continued)

*Primary Examiner* — Jeremy S Duffield

(57) ABSTRACT

Provided is a method for securing a digital document. An initial version of the digital document contains a set of data. The method comprises: generating a link value by applying a preset function to a subset of the set of data, allocating the link value to a target data belonging to the set of data and storing an entry comprising the target data in a secure storage unit, the target data being reachable in the secure storage unit through the link value, the secure storage unit being configured to use access rules for authorizing or denying a request initiated by a user and aiming at accessing the target data comprised in said entry, and generating an updated version of the digital document by removing the target data from the initial version of the digital document.

10 Claims, 2 Drawing Sheets

(56) References Cited

U.S. PATENT DOCUMENTS

| | | | |
|---|---|---|---|
| 2005/0197827 A1* | 9/2005 | Ross | G06F 40/47 |
| | | | 704/2 |
| 2009/0025063 A1* | 1/2009 | Thomas | G06F 21/6218 |
| | | | 726/4 |
| 2009/0132419 A1* | 5/2009 | Grammer | G06F 21/6245 |
| | | | 705/50 |
| 2010/0082687 A1 | 4/2010 | Saito | |
| 2013/0046835 A1* | 2/2013 | DeLuca | H04L 51/14 |
| | | | 709/206 |
| 2013/0097085 A1* | 4/2013 | Peckover | G06Q 30/0185 |
| | | | 705/50 |
| 2013/0110775 A1 | 5/2013 | Forsythe | |
| 2013/0227271 A1 | 8/2013 | Pampagnin | |
| 2016/0292441 A1* | 10/2016 | Stuntebeck | G06F 21/6218 |
| 2016/0344828 A1* | 11/2016 | Häusler | G06F 16/9535 |
| 2018/0189502 A1* | 7/2018 | Kumar | G06F 21/6254 |
| 2018/0285591 A1* | 10/2018 | Thayer | G06F 21/6245 |
| 2018/0285599 A1* | 10/2018 | Praveen | G06F 21/6254 |
| 2019/0020687 A1* | 1/2019 | Noon | G06F 16/9535 |

OTHER PUBLICATIONS

Notification of Transmittal of the International Search Report and the Written Opinion of the International Searching Authority (Forms PCT/ISA/220, PCT/ISA/210, and PCT/ISA/237) dated Dec. 13, 2019, in related International Application No. PCT/US2019/055579. (12 pages).

\* cited by examiner

METHODS FOR SECURING AND ACCESSING A DIGITAL DOCUMENT

FIELD OF THE INVENTION

The present invention relates to methods for securing digital documents. It relates particularly to methods of securing access to digital documents comprising at least two types of data requiring different security level managements.

BACKGROUND OF THE INVENTION

Many laws and company policies exist around the world to restrict access to certain classes of information stored in structured documents. It is known to encrypt the full document or to redact the document. Redaction provides no simple or automated means to recover the sensitive information. Encryption renders the document entirely unusable by any system without access to the encryption key. This creates significant inconveniences including, for example, the ability for a computer system to index file contents for the purpose of creating a searchable index. In addition, encryption of a document using a key (either cryptographic or password) requires significant controls over the key—including the distribution and control of the key. There is need to provide a solution allowing for the document to be usable and freely distributed except that access to sensitive information remain restricted.

SUMMARY OF THE INVENTION

The invention aims at solving the above mentioned technical problem.

An object of the present invention is a computer-implemented method for securing a digital document, an initial version of the digital document containing a set of data. The method comprises:
- generating a link value by applying a preset function to a subset of said set of data,
- allocating said link value to a target data belonging to said set and storing an entry comprising said target data in a secure storage unit, said target data being reachable in the secure storage unit through the link value, the secure storage unit being configured to use access rules for authorizing or denying a request initiated by a user and aiming at accessing the target data comprised in said entry,
- generating an updated version of the digital document by removing said target data from the initial version of the digital document.

Advantageously, a display value may be inserted in place of the target data in the updated version of the digital document.

Advantageously, the display value may be a random value or a meaningless token.

Advantageously, the display value and the target data may have a similar format.

Advantageously, the link value may be generated by applying the preset function to the display value.

Another object of the present invention is a computer-implemented method for securely accessing a digital document containing a set of data by a user. The method comprises:
- from a current version of the digital document, detecting the existence of a target data belonging to a previous version of the digital document and missing from the current version of the digital document,
- generating a link value allocated to the target data by applying a preset function to a subset of said set of data,
- generating a request by using the link value for retrieving the target data from a secure storage unit, and
- providing the user with the target data only if the secure storage unit successfully checked the compliance of the request with preset access rules.

Advantageously, the current version may comprise a display value in place of the target data.

Advantageously, the user may be provided with the set of data through a first software application and the target data through a second software application separate from the first software application.

Another object of the present invention is a system for securing a digital document, an initial version of the digital document containing a set of data. The system comprises a hardware processor, a secure storage unit and a generator including instructions that, when executed by the processor, cause said generator to identify a target data belonging to said set, to generate a link value by applying a preset function to a subset of said set and to store an entry comprising said target data in the secure storage unit, said target data being reachable in the secure storage unit through said link value. The secure storage is adapted to use access rules for authorizing or denying a request initiated by a user and aiming at accessing the target data comprised in the entry. Said instructions, when executed by the processor, cause said generator to generate an updated version of the digital document by removing the target data from the initial version of the digital document.

Advantageously, the generator may be configured to insert a display value in place of the target data in the updated version of the digital document.

Advantageously, the generator may be configured to set the display value with a random value or a meaningless token.

Advantageously, the generator may be configured to generate the link value by applying the preset function to the display value.

Another object of the present invention is a system for securely accessing a digital document containing a set of data. The system comprises a hardware processor and an accessor agent including instructions that, when executed by the processor, cause said accessor agent to:
- detect, from a current version of the digital document, the existence of a target data belonging to a previous version of the digital document and missing from the current version of the digital document,
- build a link value allocated to the target data by applying a preset function to a subset of said set of data. The system is adapted to generate a request by using the link value for retrieving the target data from a secure storage unit and to forward the retrieved target data to a display device for rendering to a user.

Advantageously, the current version may comprise a display value in place of the target data and the accessor agent may be adapted to generate the link value by applying the preset function to the display value.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of digital document comprising several types of data that need to be managed according to different security policies. It is well-suited for managing structured documents comprising sensitive data. It applies to any digital document like a text file or a spreadsheet document, regardless of their format.

Figure 1:
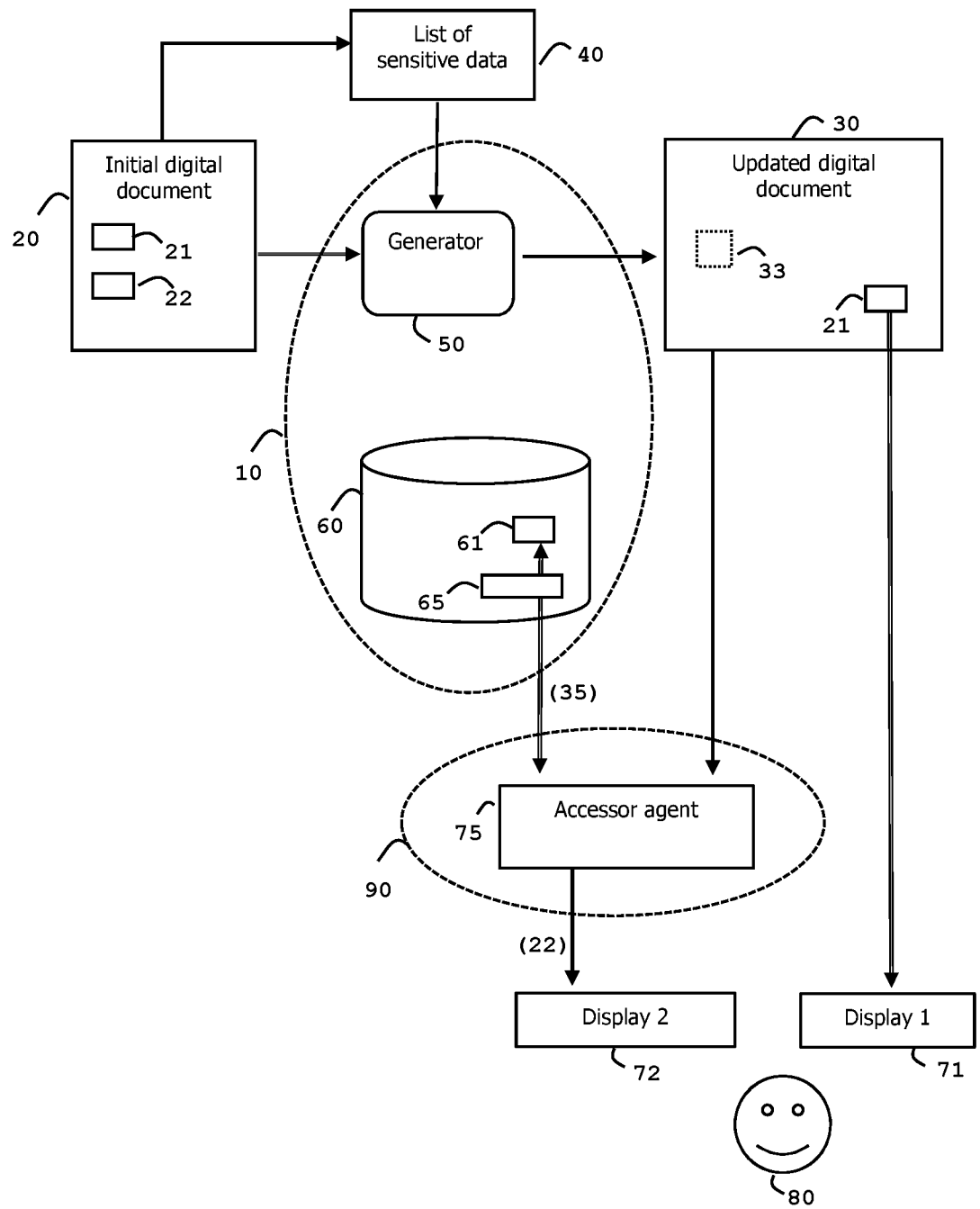
FIG. 1 shows an example of architecture of a system for generating a protected digital document and a system for securely accessing data belonging to the protected digital document according to the invention.

FIG. 1 shows an example of architecture of a securing system 10 for generating a protected digital document and an accessing system 90 for securely accessing data belonging to the protected digital document according to the invention.

In this example, the system 10 is deployed in cloud environment.

The system 10 comprises a generator 50 and a secure storage unit 60.

Let's assume that an initial version 20 of a digital document contains a set of data including at least two type of data. For instance the initial version 20 can contain both a non-sensitive data 21 and a sensitive data 22. The automated system 10 is designed to take as input data both the initial version 20 of the document and a list 40 of data of the second type (e.g. sensitive data) contained in the initial version 20 of the document. The list 40 may be built by a so-called automated Data Discovery and Classification Process.

For example data of the second type may be financial reports, medical information, personally identifiable information (PII) or confidential data.

Alternatively, the system 10 can be adapted to automatically identify the sensitive data contained in the initial version 20 of the document.

The generator includes a hardware processor and a first set of instructions that, when executed by the processor, causes said generator to generate a link value 35 by applying a preset function to a subset of said set of data, to allocate said link value to a target data (of the second type) belonging to said set of data and to record an entry 61 comprising the target data 22 in the secure storage unit 60. The target data 22 is reachable in the secure storage unit through the link value 35.

The generator has both the ability to identify the relevant input parameter(s) for the preset function and to apply the preset function to the identified input parameter(s).

If the digital document is a web page/form, the generator can build the link value 35 by using a combination of unique and unvarying elements of the content, such as the page's URL and the form field's name.

If the digital document is a spreadsheet stored in a document management system or cloud file storage system, where such system gives the document a unique and stable document identifier, the generator can build the link value 35 by using that document identifier and the coordinates of the spreadsheet cell containing the sensitive data (i.e. sheet number, column, and row).

Advantageously, the link value may be generated by concatenating a preset string with the built value. Assuming that the preset string is https://wxyz.com/app/, the generated link value may be https://wxyz.com/app/BFIJLPSTVZ.

The link value may be generated as a Uniform Resource Locator (URL).

Other examples for identifying the relevant input parameter(s) and the preset function can be applied to digital documents structured by record or by lines. For instance, in a text file, the (non-sensitive) content of all odd lines preceding the line comprising the target data can be taken as input parameter(s) and the preset function can be a Hash function.

Thus the link value can be generated from metadata of the digital document, data contained in the document or a combination of both.

The generator includes a second set of instructions that, when executed by the processor, cause said generator to generate an updated version 30 of the digital document by removing the target data from the initial version of the digital document. It is to be noted that the data of the first type (e.g. non-sensitive data) remain present in the updated version 30 of the digital document.

The subset of data used as input parameter(s) of the preset function must be kept in the updated version 30 of the digital document.

Advantageously, the generator can be configured to generate a display value (noted 33 at FIG. 1) and to insert this display value in place of the target data (noted 22 at FIG. 1) in the updated version 30 of the digital document.

In one embodiment, the generator can be adapted to generate a display value having a random value.

In another embodiment, the generator can be adapted to generate a display value that gives an indication to the user (reader). Thus the user may have the choice to click on the display value (in the updated version of the document) to trigger the retrieving of the corresponding target data.

In another embodiment, the generator can be adapted to select a display value among a predefined list of strings or to use a unique predefined string for all target data to be replaced.

Hence, the generator can be designed to insert either a meaningful or meaningless display value.

The generator can be designed to set the display value with a non-textual information like an icon or a button.

Preferably, the generator creates a display value having a format similar to those of the initial target data. For instance, assuming that the target data has the following format: 123-45-6789, the display value can be: 000-11-2222 or XXX-XX-6789. Hence the format of the inserted data replacing the original data is kept unchanged.

The generator can be adapted to generate the link value by applying a preset function to the display value. In other words, the generator can use both the display value and a subset of the data of the initial version 20 for generating the link value. By reference to the above-described example and assuming that the display value is xxxxx57, the generated link value can be https://wxyz.com/app/BFIJLPSTVZ/xxxxx57.

In order to simplify the presentation, only one target data 22 is represented at FIG. 1. The initial version of the document may comprise several target data which are removed and associated to as many link values by the generator.

The initial version of the document may also comprise data of more than two types and the generator may apply different preset functions (and policy to select the input parameter) according to each type of data.

The secure storage unit 60 can include a database (or a file system), a set of access rules and a controller engine 65 able to check whether a request trying to access a record stored in the secure storage unit complies with the access rules. The controller engine is able to authorize or deny the request according to predefined access rules. The controller engine may check user's credentials like a passphrase, a biometric data, a One-Time password or a cryptographic value computed from a secret key allocated to the user for example.

Each entry stored in the secure storage unit 60 can comprise several fields. For example, an entry may have the following structure:

| Index | URI | Short code | Metadata | Information |
|-------|-----|------------|----------|-------------| where Index has a unique value allowing to identify the entry among the others, where URI is the link value, where Short Code is the display value, where Metadata may contain various data like the entry creation/update date, author, country origin, file name of the updated version of the document, and where Information is a target (e.g. sensitive) data removed from the document.

In one embodiment, the access rules can be defined according to the profile of the users. For instance, a user accredited at level 2 is authorized to access all types of data while a user accredited at level 1 can only access data of first type.

In another embodiment, the access rules can be defined according to both the profile of the user and the type of data. For instance, a financial data can be accessed only by Finance employees.

In another embodiment, the access rules can be defined so as to take into account the type of user's device (e.g. a Personal computer may be assumed to be more secure than a smart phone).

In another embodiment, the access rules can be defined to take into account the user's location. Thus access to a target data type can be restricted to users located in the company office only for instance.

In another embodiment, the access rules can define access rights which are set with an expiration date.

The system can be configured to log any attempt to access data of the second type from the updated version of the digital document. Hence repeated unauthorized attempts may be detected and trigger appropriate security measures. Such log may also be used to monitor and size the system 10.

Although the system 10 described at FIG. 1 manages two types of data, it may manage a large number of types of data.

Once the updated version 30 of the document has been generated, it can be made available to a user 80.

The user may be an individual, a software application or a computer machine.

The system 90 for securely accessing data belonging to the updated version 30 of the digital document can be deployed on client side. For instance, it may be hosted in a laptop or a smartphone.

The system 90 comprises a processor and an accessor agent 75 including a first set of instructions that, when executed by the processor, cause said accessor agent to detect, from the current version 30 (e.g. updated version) of the digital document, the existence of a target data belonging to a previous version of the digital document and missing from the current version of the digital document.

For example, the accessor agent 75 can be adapted to detect the presence of a predefined list of fields in the current version 30 for deducing the existence of a target data belonging to a previous version of the digital document. For instance, the accessor agent 75 can be configured to detect a field named "secret key", "passport number" or "Amount" and to deduce that a corresponding sensitive data should be retrieved from the secure storage unit.

In another example, the accessor agent 75 can be adapted to detect the presence of a predefined list of patterns (or tokens) which are assumed to be display values inserted by the system 10.

In another example, the accessor agent 75 can be adapted to detect the existence of a target data belonging to a previous version of the digital document by applying a predefined function to a part of the current version of the document. For instance by applying a hash function to the first 5 lines (or records or cells) and comparing the result with a list of pre-stored reference hashes.

Regarding the detection of removed data, another option would be using the unique identifier of the enclosing document to look up the list of all sensitive data removed from the original, then using information from the meta data stored with each entry in that list to know which fields in the document are replacements. For example, a list of replacements can be retrieved from a specific document, then see that the list includes a data located at cell E5 in the document.

The accessor agent 75 includes a second set of instructions that, when executed by the processor, cause said accessor agent to build a link value 35 allocated to the target data by applying a preset function to a subset of the data found in the current version 30. In fact the accessor agent is adapted to re-compute the link value which has been created and allocated to the target data by the system 10.

The accessor agent is designed to perform selection and computation operations similar to those made by the generator 50 of the system 10.

The system 90 is configured to generate a request by using the link value for retrieving the target data from the secure storage unit 60 and to forward the retrieved target data to a display device 72 for rendering to a user.

In one embodiment, the accessor agent directly sends the request (comprising the computed link value) aiming at retrieving the target data from the secure storage unit 60, receives the target data and provides the display device 72 with the target data. The non-sensitive data can be displayed to the user through another display device 71.

When the user 80 start reading the updated version of the document, the non-sensitive data 21 can be freely displayed to the user through a first device 71 like a software application (e.g. MS-Word®) while the sensitive data 22 is displayed to the user through the second device 72 like a software application (like Web-browser) only if the user has properly authenticated to the secure storage unit 60.

Alternatively, both first and second devices may be merged in a single one so that the user can read the whole document through a single device.

In another embodiment (not shown), the system 90 can include the display device 72 and the accessor agent can provide the display device 72 with the computed link value. The display device 72 can be adapted to generate the request by using the link value and to send it to the secure storage unit 60 for retrieving the target data.

Figure 2:
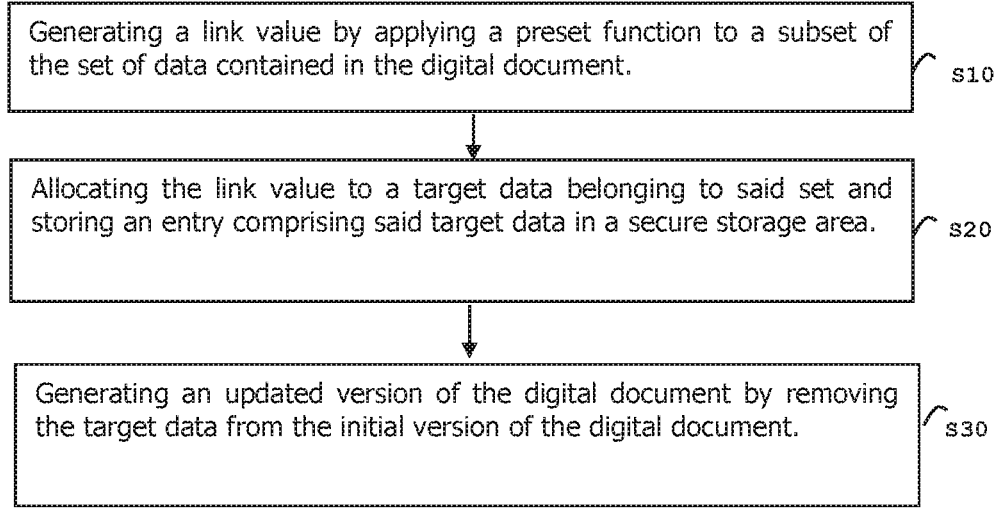
FIG. 2 depicts a flow chart for securing access to a digital document according to an example of the invention.

FIG. 2 shows a flow chart for securing access to a digital document according to an example of the invention.

By reference to FIG. 1, the initial version 20 of the digital document contains a set of data (i.e. both sensitive and non-sensitive data). In a preliminary phase, the initial version 20 has been parsed to identify a list 40 of sensitive data. This operation can be performed manually or automated using mechanism automated Data Discovery and Classification Process which is known per se.

At step S10, a subset (at least one non-sensitive data) of said set of data is identified then a link value is computed by applying a preset function to the identified subset. Part of data contained in the digital document may be meta-data attached to the document itself like the name of the file of the document, the URL of the web page allowing to get the digital document, the version number of the document or the author.

At step S20, the link value 35 is allocated to a target data 22 belonging to list 40 and an entry 61 comprising said target data is recorded in the secure storage unit 60. The link value allows to reach the target data 22 in the secure storage. The secure storage unit is configured to check access rules for authorizing or denying a request initiated by a user and aiming at accessing a data stored in one of its entries.

At step S30, an updated version 30 of the digital document is created by removing the target data 22 from the initial version 20 of the digital document.

It is to be noted that at the end of this step, the target data does not appear as such in the updated version any more. It has been moved to the secure storage unit 60.

Advantageously, a display value 33 can be identified and inserted in place of the target data 22 in the updated version 30 of the digital document. The display value can be generated on-the-fly or retrieved from a preset list of pattern stored in the secure storage unit or in another device.

In one embodiment, the link value may also be generated by applying the preset function to both the identified subset and the display value (at step 20).

This sequence is performed for each data of the list 40. If the initial version of the document contains sensitive data requiring different security levels, the process (steps 10 & 20) can be executed several times using different preset functions and/or policies to identify the subset of data to be used as input parameter(s) of the preset functions.

Figure 3:
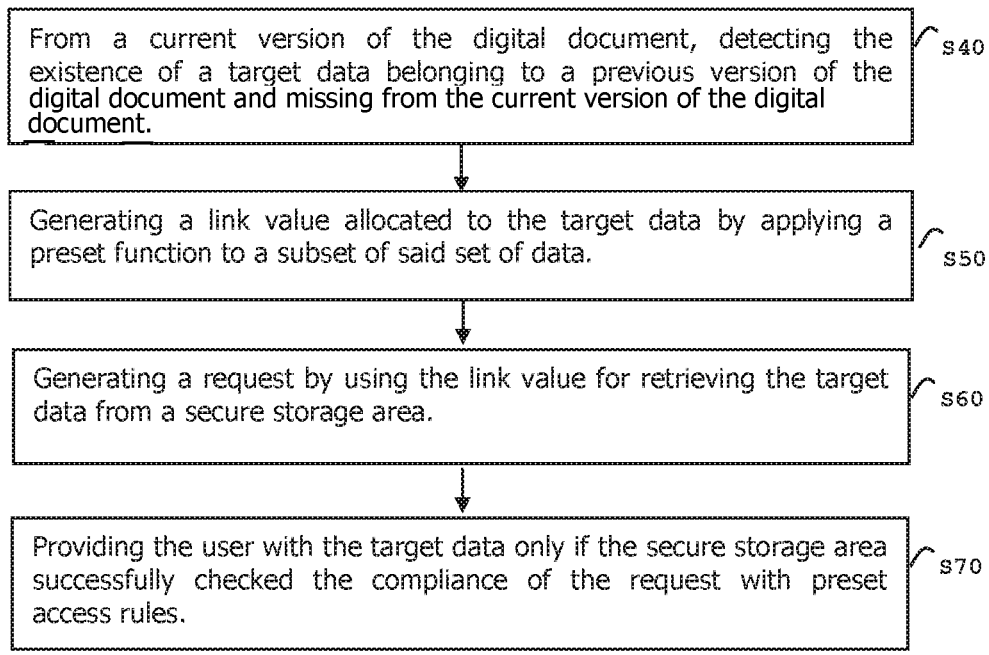
FIG. 3 depicts a flow chart for securely accessing a digital document according to an example of the invention.

FIG. 3 shows a flow chart for securely accessing a digital document according to an example of the invention.

An updated version 30 of the digital document is assumed to have been generated according to the process of FIG. 2. In this example, the updated version 30 comprises non-sensitive data only.

The updated version of the digital document is made available to a user 80. The updated version (also named current version) can be sent to the user or made available via a repository for example.

At step 40, the existence of a target data (i.e. sensitive data) belonging to the previous (e.g. initial) version of the digital document and missing from the current version of the digital document is detected. This detection operation is carried out on the basis on the current version of the digital document only.

Alternatively, the list 40 can be used to detect the existence of the target data 22.

At step 50, a subset of the content of the current version is identified in relation with the target data then a link value allocated to the target data is generated by applying a preset function to the identified subset.

For instance, the digital document can be a digital record in a software-as-a-service system, such as Salesforce™, which is being viewed by a user via a web page. The link value can be derived from record and field IDs extracted from the web page.

It is to be noted that each version of the digital document can be handled through several formats. In particular the rendering format may be different from the storing format. For instance, the updated version of the digital document can be stored using a XML or JSON format while it can be displayed on a web page using a HTML format. In other words, data belonging to the digital document may be expressed using different formats.

Different context information may be used from each version/format to derive the link, but that in each case, the method of derivation must resolve to the same link. For example, if a document may be in either a JSON format or an HTML format. For the JSPN format, the link value can be computed from a JSON record ID and JSON attribute names. For the HTML format, the link value can be computed from the URL and form field IDs. Both formats are assumed to result in the same final link value.

The syntax elements of the used format can be considered as being data belonging to a particular version of the digital document.

At step 60, a request is built by using the link value for retrieving the target data from the secure storage unit.

At step 70, the target data is provided to the user (via a display device) only if the secure storage unit successfully checked the compliance of the request with preset access rules. (i.e. if the user is authorized to access the target data.)

It is to be noted that request generation and request sending can be fully automated so that the user does not need to explicitly trigger the retrieving of the target data. The user can be requested to provide his/her credentials (and possibly additional information) so that the secure storage unit can perform the access rules checking.

In one embodiment, assuming that the request has been authorized, the target data can be displayed to the user via a specific display device 72 (like a browser) while the non-sensitive data contained in the current version 30 are displayed to the user through another display device 71. Alternatively, all data can be displayed to the user through a single display device.

It is to be noted that the rendering of the data to the user can also be done via sound or tactile interfaces.

In one embodiment, the user must authenticate each time a request to retrieve a sensitive data is received by the secure storage unit.

In another embodiment, the secure storage unit may authenticate the user only once and authorize further access from this user during a session without new credentials checking. For instance a session can be an authenticated context established between the user's web browser and the web server which provides access to the sensitive data. The session can be materialized as a cookie.

It must be understood, within the scope of the invention, that the above-described embodiments are provided as non-limitative examples. In particular, the features described in the presented embodiments and examples may be combined.

The invention applies to any types of access like read access and write access.

A secure storage unit can store data related to several updated versions of a plurality of documents.

The invention allows freely forwarding or distributing a document without revealing certain critical information. Hence the updated version of a document may be emailed, printed, stored on a cloud service without containing certain information whose access must remain restricted. Moreover, the access control rules can be applied selectively based on who is accessing, on what device, from where as well as the class of the information.

Thanks to the invention, access to part of the document can be dynamically refined (Access rules can be changed at any time) since Access rules are enforced only when a user attempts to access the protected data.

In addition, the invention allows to centralize credentials management and highly ease the management of secret/encryption keys.

The architectures of the systems shown at FIG. 1 are provided as example only. These architectures may be different. For example, the generator can work with several secure storage units or the secure storage unit can include several databases. The secure storage unit can include a web server which manages the interface between users and the secure storage unit and performs checking operations for authentication and authorization of the user.

Although described in the framework of cloud environment, the invention also applies to any type of framework.

The invention claimed is:

1. A computer-implemented method for securely accessing a digital document containing a set of data by a user, the method comprising:
   from a current version of the digital document, detecting the existence of a target data belonging to a previous version of the digital document and missing from the current version of the digital document, said current version being devoid of a link value allowing to retrieve said target data from a secure storage unit, said detecting being done only by analyzing the current version and without taking into account any additional data included in the current version compared to the previous version,
   automatically identifying, in the current version, a subset of data of said set of data, said subset containing context data related to said target data, and the subset belonging to the previous version,
   generating said link value allocated to the target data by applying a preset function to said subset of said set of data,
   generating a request by using the link value for retrieving the target data from the secure storage unit,
   providing the user with the target data only if the secure storage unit successfully checked the compliance of the request with preset access rules,
   wherein said current version of the digital document encompasses both text and metadata contained in the digital document,
   wherein said digital document is structured by lines and said context data is the content of a specific set of lines preceding the target data,
   wherein existence of the target data belonging to the previous version is detected by applying a hash function to a part of the current version,
   wherein said a part of the current version is a predefined set of lines, records or cells of the current version.

2. The method according to claim 1, wherein the current version comprises a display value in place of the target data.

3. The method according to claim 1, wherein the user is provided with the set of data through a first software application and said target data through a second software application separate from the first software application.

4. A system for securely accessing a digital document containing a set of data, the system comprising a hardware processor,
   wherein the system comprises an accessor agent including instructions that, when executed by the processor, cause said accessor agent to:
   detect, from a current version of the digital document, the existence of a target data belonging to a previous version of the digital document and missing from the current version of the digital document, said current version being devoid of a link value allowing to retrieve said target data from a secure storage unit, said accessor agent detecting the existence of the target data only by analyzing the current version and without taking into account any additional data included in the current version compared to the previous version,
   automatically identify, in the current version, a subset of data of said set of data, said subset containing context data related to said target data, and the subset belonging to the previous version,
   build said link value allocated to the target data by applying a preset function to said subset of said set of data,
   wherein the system is configured to generate a request by using the link value for retrieving the target data from the secure storage unit and to forward the retrieved target data to a display device for rendering to a user,
   wherein said current version of the digital document encompasses both text and metadata contained in the digital document,
   wherein said digital document is structured by lines and said context data is the content of a specific set of lines preceding the target data,
   wherein the accessor agent detects existence of the target data belonging to the previous version by applying a hash function to a part of the current version,
   wherein said part of the current version is a predefined set of lines, records or cells of the current version.

5. The system according to claim 4, wherein the accessor agent is configured to render the target data to the user via a sound interface.

6. The method according to claim 1, wherein the user is provided with said target data through a sound interface.

7. The method according to claim 1, wherein said context data is the content of all odd lines preceding the target data.

8. The method according to claim 1, wherein existence of the target data belonging to the previous version is detected by detecting presence of a predefined field in the current version.

9. The system according to claim 4, wherein said context data is the content of all odd lines preceding the target data.

10. The system according to claim 4, wherein the accessor agent detects existence of the target data belonging to the previous version by detecting presence of a predefined field in the current version.

* * * * *